July 4, 1933.   C. S. MALOTT, JR   1,916,888
HEAT RECLAIMER
Filed Sept. 3, 1932
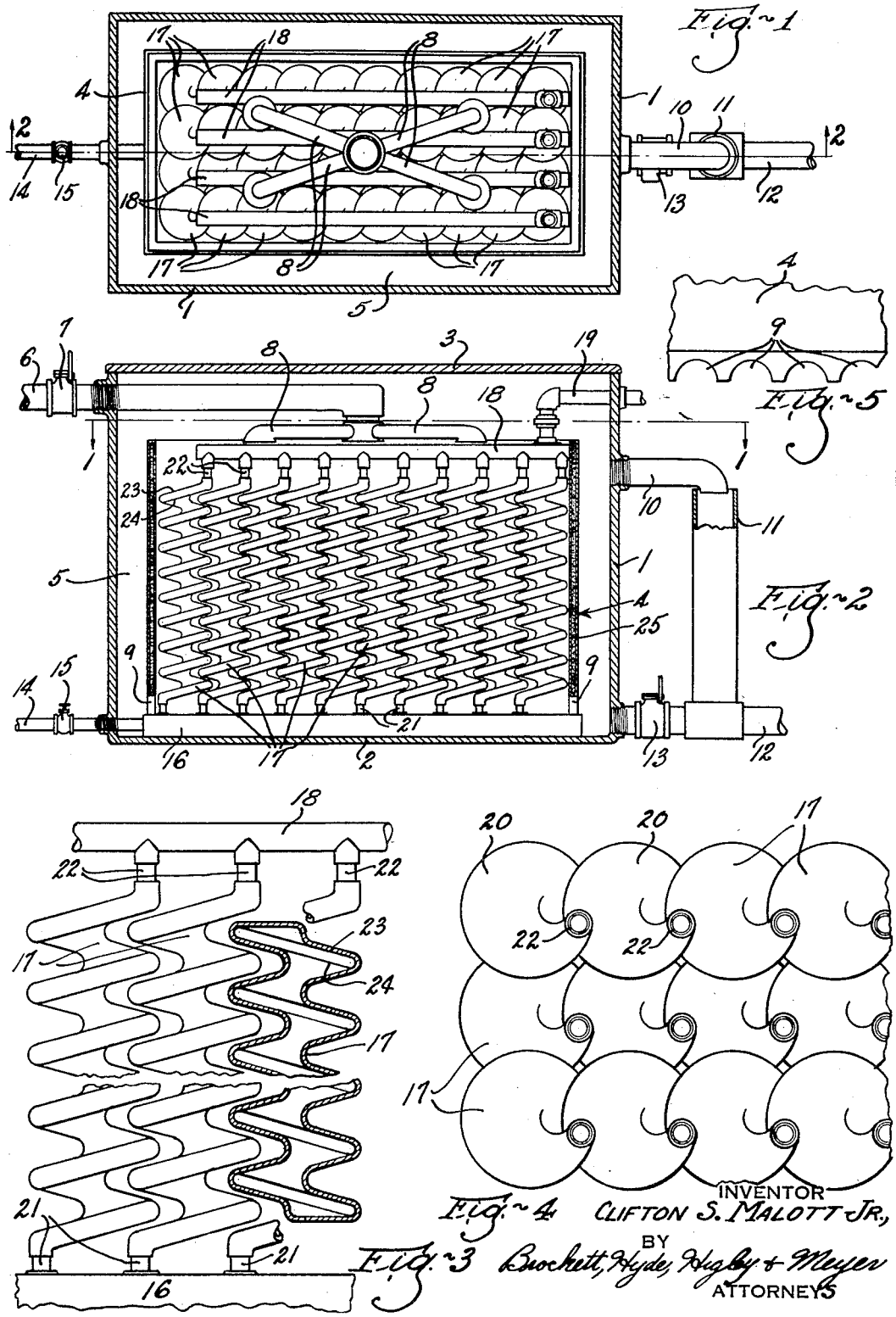
INVENTOR
CLIFTON S. MALOTT JR.,
BY
Brockett, Hyde, Hugby & Meyer
ATTORNEYS Patented July 4, 1933

1,916,888

UNITED STATES PATENT OFFICE

CLIFTON S. MALOTT, JR. OF CINCINNATI, OHIO, ASSIGNOR TO AMERICAN LAUNDRY MACHINERY COMPANY, OF CINCINNATI, OHIO, A CORPORATION OF OHIO

HEAT RECLAIMER

Application filed September 3, 1932. Serial No. 631,663.

This invention relates to heat reclaimers, such as are used for reclaiming the heat from hot waste water. One use, for example, is in laundries where the heat of the waste water ordinarily flowing in heated condition to the sewer is reclaimed and applied to the fresh unused water flowing on its way to the boiler or other heating device, although it will, of course, be understood that the invention is adapted for use in any place where the heat of a liquid is to be reclaimed.

The object of the invention is to provide a more efficient heat reclaimer, and more particularly a reclaimer including a series of generally spiral hollow cast members lying in parallel relation and interlocked or internested with each other in all directions, so that the total space within said containers is substantially equal to the total space surrounding them and wherein both the water to be heated and the heating water are spread out into relatively thin streams with close contact of all parts of the water with a surface of the wall of metal intervening between the two streams, so that heat transfer is very efficient.

A further object of the invention is to provide an arrangement of this kind which operates entirely on the counterflow principle with the two streams of water flowing by spiral paths, one clockwise and the other counterclockwise, to thereby increase efficiency.

A further object is to provide a heat reclaimer including a series of nested containers mounted within a casing having outer and inner walls, the inner wall being made of heat insulating material and being mounted and arranged to maintain a uniform level of waste water surrounding the fresh water containers and nevertheless shielding the latter from the effect of the cooled waste water flowing to the outlet.

A further object is to provide an arrangement of this kind in which very efficient heat transfer is secured in minimum volume.

Further objects of the invention are in part obvious and in part will appear more in detail hereinafter.

In the drawing, which represents one suitable embodiment of the invention, Fig. 1 is a sectional plan view on substantially the line 1—1, Fig. 2; Fig. 2 is a detail sectional elevation on substantially the line 2—2, Fig. 1; Fig. 3 is an enlarged detail elevation, partly in section, of a number of the spiral containers, showing the manner in which they are intermeshed; Fig. 4 is an enlarged detail plan view of the containers shown in Fig. 3; and Fig. 5 is a fragmentary elevation of a portion of the inner casing wall.

The heat reclaimer shown in the drawing comprises a suitable casing having outer end and side walls 1, a bottom 2, and a top or cover 3, which may be removable, if desired. It is also provided with an inner wall member 4, having end and side walls to correspond with the outer casing and spaced therefrom to form a cavity 5. The liquid from which heat is to be removed or reclaimed, such as heated waste water, is supplied to the chamber within the reclaimer through a supply pipe 6 provided with a controlling valve 7 and communicating with a series of arms 8 which distribute the heated water to various points over the area of the chamber within the inner wall 4. It flows down through said chamber and outwardly from its bottom through a series of openings or recesses 9 in the wall 4, rising through the gap or cavity 5 to an outlet pipe 10, the opening at the outer end of which directs the outflowing stream to a riser 11 communicating with the drain pipe 12. 13 indicates a valve in a bypass leading directly from the cavity 5 to the drain pipe 12, by opening which valve the entire liquid content of the cavity within the casing 1 may be flushed to the sewer for cleaning purposes or the like, as will be readily understood.

Within the inner wall 4 I locate a series of hollow containers through which the water to be heated is circulated. This fresh cold water is led to the reclaimer by a supply pipe 14 having a controlling valve 15, said pipe communicating with one or more headers 16 to which are connected the lower ends of the spiral hollow containers marked generally 17. The upper ends thereof communicate with one or more headers 18 which in turn communicate with an outflow pipe 19, through which the heated water is conducted to the place where it is to be used.

The several containers 17 are all of the same construction, so that description of one will suffice for all. Each thereof is formed as a hollow casting with the metal thereof shaped to form a spiral vane or flight 20. The necks 21, 22 which respectively communicate with the supply header 16 and the discharge headers 18 are outwardly from the central axis, and, as shown in Fig. 3, the flight itself is so formed as to practically avoid any semblance of hollow central channel or opening along the central axis, but any liquid admitted to one or the other of the necks 21, 22 and permitted to flow through the hollow spiral container must do so by a tortuous and particularly by a spiral path. Again, the upper and lower walls 23, 24 of the flight of this spiral container are relatively close together, so that the liquid stream is reduced to relatively thin form with very close contact of all of the liquid within the container with the inner surface of the metal wall thereof.

The several containers, of which any suitable number may be employed according to the desired heat reclaiming capacity, are mounted in vertical position with their central axes parallel to each other. More than that, they are closely internested, or, in other words, the axes of the several containers are spaced from each other a distance appreciably less than the over-all external diameter of the containers, as clearly shown in Fig. 4. While the containers are of spiral form, they readily interlock or internest with each other, as shown in Figs. 3 and 4, and this internesting is carried to a point where the metal walls of adjacent containers are spaced from each other by a relatively small distance. As a result, the open cavity or space surrounding or on the outside of the several containers is considerably reduced in volume, so much so that the total volume of the open space surrounding the containers is approximately the same as the total open space within them.

With this arrangement, assuming the water to be heated to flow upwardly through the containers in Fig. 2, said water to be heated rises along a spiral path which is counter-clockwise in Fig. 4 when viewed from above. On the contrary, the heating water delivered through the arms 8 of the supply pipe flows downwardly in the cavity within the inner wall 4, but on the outside of the containers, and by a series of paths around the outside of the several containers and consequently of more or less spiral form, but moving downwardly with a clockwise motion in Fig. 4. The heating water is also reduced to a number of relatively thin streams so that all portions of the water have close contact with the outer surfaces of the containers. The reclaimer therefore operates by the counterflow principle, with the heating water moving downwardly and becoming cooler and cooler and the water to be heated moving upwardly and becoming warmer and warmer, with an efficient heat transfer. The heating water which reaches the bottom of the cavity within the wall 4 passes outwardly through the openings 9 into the cavity 5 around the wall 4. The wall 4 is made of heat insulating material, such as two layers of sheet metal spaced apart and confining in the space between them a layer 25 of suitable heat insulating material such as asbestos or the like. This heat insulating wall prevents heat transfer through it, so that the cooler water admitted to the bottom of the cavity 5 reaches the outlet pipe 10 and flows outwardly therethrough without absorbing heat, and consequently leaves the reclaimer at the lowest possible temperature. As a result, the reclaimer is exceedingly efficient in operation. Other advantages will readily occur to those skilled in the art.

What I claim is:

1. A heat reclaimer of the character described, comprising a series of hollow generally spiral container members each having a more or less thin and generally spiral vane and being formed to avoid a direct open channel along the central axes, said containers being mounted in parallel relation with their vanes interlocked with each other, means for causing parallel flow of water to be heated through said containers in one direction, and means for causing flow of heating water in the opposite direction along the outside of said containers.

2. A heat reclaimer of the character described, comprising a hollow casing having inner and outer walls separated by a circumferentially extending cavity, means for causing flow of heating water downwardly in the chamber within the inner wall, said inner wall having openings near its bottom leading to said cavity, and said cavity having an outlet at an upper level, and a series of hollow generally spiral containers within said inner chamber, each thereof having a generally spiral relatively thin vane and arranged to avoid a direct central opening along the axis, said containers being mounted in parallel relation with their vanes interlocking, and means for circulating water to be heated upwardly through said containers.

3. A heat reclaimer of the character described, comprising a hollow casing having inner and outer walls separated by a circumferentially extending cavity, means for causing flow of heating water downwardly in the chamber within the inner wall, said inner wall having openings near its bottom leading to said cavity, and said cavity having an outlet at an upper level, and a series of hollow generally spiral containers within said inner chamber, each thereof having a generally spiral relatively thin vane and arranged to avoid a direct central opening along the axis, said containers being mounted in parallel relation with their vanes interlocking, and means for circulating water to be heated upwardly through said containers, said inner walls being made of heat insulating material.

In testimony whereof I hereby affix my signature.

CLIFTON S. MALOTT, Jr.